United States Patent
Palamara et al.

(10) Patent No.: US 8,518,155 B2
(45) Date of Patent: Aug. 27, 2013

(54) METHOD AND APPARATUS FOR SEPARATING GASES

(75) Inventors: John Eugene Palamara, Macungie, PA (US); Kevin Boyle Fogash, Wescosville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 527 days.

(21) Appl. No.: 11/686,982

(22) Filed: Mar. 16, 2007

(65) Prior Publication Data

US 2008/0223214 A1    Sep. 18, 2008

(51) Int. Cl.
*B01D 53/14*    (2006.01)

(52) U.S. Cl.
USPC ............ 95/163; 95/172; 95/177; 95/192; 95/208; 95/236; 96/234

(58) Field of Classification Search
USPC ............ 95/160, 163, 172, 177, 192, 208, 95/236, 266; 96/234, 193
See application file for complete search history.

(56) References Cited

U.S. PATENT DOCUMENTS

| | | | |
|---|---|---|---|
| 1,809,441 A | | 6/1931 | Elliott |
| 2,652,129 A | * | 9/1953 | Benedict .......................... 95/177 |
| 3,121,624 A | * | 2/1964 | Matsch et al. ................. 95/175 |
| 3,593,491 A | * | 7/1971 | Tennyson ........................ 95/177 |
| 3,664,091 A | * | 5/1972 | Hegwer ........................... 95/161 |
| 4,087,261 A | | 5/1978 | Hays |
| 4,171,964 A | * | 10/1979 | Campbell et al. ............... 62/621 |
| 4,180,267 A | * | 12/1979 | Harrop ...................... 273/127 R |
| 4,240,922 A | * | 12/1980 | Sartori et al. .................. 252/189 |
| 4,242,108 A | * | 12/1980 | Nicholas et al. ................. 95/166 |
| 4,346,560 A | | 8/1982 | Rapier |
| 4,568,364 A | * | 2/1986 | Galstaun et al. ................ 95/176 |
| 4,589,896 A | * | 5/1986 | Chen et al. ........................ 92/28 |
| 4,602,477 A | * | 7/1986 | Lucadamo ...................... 62/624 |
| 4,755,258 A | | 7/1988 | Ryham |
| 5,061,465 A | * | 10/1991 | Carter ............................ 423/229 |
| 5,462,583 A | * | 10/1995 | Wood et al. ..................... 95/192 |
| 5,551,972 A | * | 9/1996 | Wood et al. ..................... 95/192 |

(Continued)

FOREIGN PATENT DOCUMENTS

AU    18039 76 A    4/1978
GB    2 177 017 A    1/1987

OTHER PUBLICATIONS

Chiesa, P. and Consonni, S., "Shift Reactors and Physical Absorption for Low-CO2 Emission IGCCs", J. Eng. Gas Turb. Power, 21, 295, (1999).

(Continued)

*Primary Examiner* — Duane Smith
*Assistant Examiner* — Phillip Shao
(74) *Attorney, Agent, or Firm* — Michael K. Boyer

(57) ABSTRACT

A method and apparatus for removing carbon dioxide from a synthesis gas stream containing hydrogen is disclosed. The method includes absorbing the carbon dioxide using a physical solvent under high pressure and then liberating the carbon dioxide in a series of expansion stages where the pressure on the solvent is reduced. The expansion ratio increases with each expansion stage. The apparatus includes expansion stages having throttling devices and expansion tanks operated at increasing expansion ratios. Carbon dioxide is liberated in this manner so as to minimize the energy required compress for transport via a pipe line for sequestration of the gas. Sequestration of the carbon dioxide is preferred to atmospheric venting to curb the release of greenhouse gases.

24 Claims, 2 Drawing Sheets

(56) References Cited

U.S. PATENT DOCUMENTS

| | | | |
|---|---|---|---|
| 7,699,914 B1* | 4/2010 | Morrow et al. | 96/234 |
| 2002/0124594 A1 | 9/2002 | Rojey et al. | |
| 2004/0003717 A1* | 1/2004 | Gaskin | 95/176 |
| 2004/0091409 A1* | 5/2004 | Allison | 423/220 |
| 2006/0115691 A1* | 6/2006 | Hilmen et al. | 429/13 |

OTHER PUBLICATIONS

Chiesa, P. and Consonni, S., Kreutz, T., Williams, R., "Co-production of Hydrogen Electricity and CO2 from Coal with Commercially Ready Technology. Part A: Performance and Emissions", Intl. J. Hydro. Energy, 30, 747, (2005).

Chiesa, P., et al; "Co-Production of Hydrogen, Electricity and CO2 from Coal with Commercially Ready Technology. Part A: Performance and Emissions"; International Journal of Hydrogen Energy, Elsevier Science Publishers B.V., Barking, GB; vol. 30, No. 7; Jul. 1, 2005; pp. 747-767; XP025263097.

Chiesa, P., et al; "Co-Production of Hydrogen, Electricity and CO2 from Coal with Commercially Ready Technology Part A: Performance and Emissions"; International Journal of Hydrogen Energy 30; 2005; pp. 747-767.

Burr et al; "A Comparison of Physical Solvents for Acid Gas Removal;" 87th Gas Processors Association Annual Convention, Mar. 2008.

* cited by examiner

METHOD AND APPARATUS FOR SEPARATING GASES

BACKGROUND OF THE INVENTION

This invention relates to a method and an apparatus for separating gases, for example, removing acid gases from a synthesis gas stream containing hydrogen and derived from a partial oxidation or gasification process.

In the production of hydrogen, synthesis gas containing hydrogen as well as other undesired constituents, is derived from various processes such as steam methane reforming, the water gas shift reaction, and the gasification of various solids such as coal, coke, and heavy liquid hydrocarbons present in oil refinery waste products. The undesirable gas components include "acid gases" such as carbon dioxide and hydrogen sulfide.

As it is advantageous to "sweeten" the synthesis gas by removing the acid gases before further processing, various types of acid gas removal systems are used. Acid gas removal systems could use either chemical or physical solvents. Acid gas removal systems which use a physical solvent employ solvents such as dimethyl ethers of polyethylene glycol, methanol, or propylene carbonate, which is brought into contact with the synthesis gas under high pressure (e.g., 1,200 psia) wherein the acid gases are preferentially absorbed by the solvent. The solvent is then depressurized in a series of "flash expansions" which liberate the dissolved acid gases from the solvent. The acid gas removal system yields substantially separate gas streams for the hydrogen sulfide and the carbon dioxide. The hydrogen sulfide is directed to a sulfur recovery unit, which most often uses a Claus process to reclaim the sulfur. The carbon dioxide is normally vented to the atmosphere.

However, so as not to further contribute to global warming believed to be caused by greenhouse gases such as carbon dioxide, it is advantageous to sequester the carbon dioxide rather than release it to the atmosphere. Considering the volume of gas to be sequestered, it is preferable to use geological formations such as oil wells or underground saline aquifers to store the carbon dioxide. The carbon dioxide may be transported by pipeline and pumped into the well head or aquifer. Sequestration in oil wells confers the added benefit of enhancing oil recovery from operating wells.

Sequestration of the carbon dioxide requires that substantial compression and pumping facilities be added to the acid gas removal system in view of the high pressures and large gas volumes which sequestration entails. It is calculated that, for pipeline transport and sequestration of the gases, the carbon dioxide will need to be compressed to pressures as great as 200 bar. Of the various steps involved in the removal of carbon dioxide from a synthesis gas stream including capture of the gas, compression, and transportation to the storage site, compression can account for more than 50% of the cost of the process. It is not surprising, therefore, that efforts have been made to optimize the compression step of the process.

In a paper entitled "Shift Reactors and Physical Absorption for Low-$CO_2$ Emission IGCCs" (Journal of Engineering for Gas Turbines and Power, April 1999, Volume 121, P. 295) authors Chiesa and Consonni describe operation of an acid gas removal system wherein the expansion ratios of the expansion stages of the solvent which liberate the dissolved carbon dioxide are constant for all expansion stages. In this paper, Chiesa and Consonni teach that the power consumption of the separation and compression section of an acid gas removal system does not change appreciably when the pressures of the expansion stages are varied (page 301).

In a subsequent paper entitled "Co-production of Hydrogen, Electricity and $CO_2$ from Coal with Commercially Ready Technology" (International Journal of Hydrogen Energy, 30 (2005) 747-767) authors Chiesa, Consonni et al teach operating an acid gas removal system with "four flash drums to reduce $CO_2$ compression power" and wherein "the pressures of intermediate flash drums are set to minimize overall $CO_2$ compression power" (page 753). Table 4 (page 760) from the paper shows that between the second and third expansion stages the expansion ratio is increased. However, a constant expansion ratio is used between the third and fourth stages.

In contrast to the aforementioned teachings of the prior art, applicants have found that further significant efficiency improvements can be obtained in the operation of an acid gas removal system that includes compression of the carbon dioxide if at least three pressure reduction stages are used wherein the expansion ratios of each of the stages are increasing. In the method according to the invention, by operating with increasing expansion ratios, more of the carbon dioxide is liberated at elevated pressures, which reduces the work required later for compression. Calculations show that a decrease in compression power consumption as great as 4.5% over the aforementioned prior art (Chiesa et al, 1999) may be obtained by the method of acid gas removal according to the invention.

BRIEF SUMMARY OF THE INVENTION

The invention concerns a method of removing a gas dissolved in a liquid under pressure. The method comprises reducing the pressure on the liquid at a first expansion ratio. A first portion of the gas is released from the liquid upon the pressure reduction. The gas is then separated from the liquid. The pressure on the liquid is reduced a second time at a second expansion ratio greater than the first expansion ratio, whereupon a second portion of the gas is released from the liquid. The second portion of the gas is separated from the liquid, and the pressure on the liquid is reduced a third time at a third expansion ratio greater than the second expansion ratio, a third portion of the gas being thereby released from the liquid.

The method may further include compressing the gas portions released from the liquid, transporting and sequestering the gas portions in a storage facility.

In a specific example application, the invention concerns a method of removing carbon dioxide from a gas mixture comprising hydrogen. The method comprises bringing the gas mixture into contact with a liquid physical solvent under pressure. The solvent preferentially absorbs carbon dioxide from the gas mixture. The pressure on the solvent is then reduced in a first pressure reduction stage and a plurality of subsequent pressure reduction stages wherein each subsequent pressure reduction stage occurs at an expansion ratio greater than the pressure reduction stage which preceded it. A portion of the carbon dioxide absorbed by the solvent is released from the solvent at each pressure reduction stage.

The method may further include reducing the pressure on the solvent in a product gas recovery stage which precedes the first pressure reduction stage. Carbon dioxide and other gases, including for example hydrogen, are released from the solvent in the product gas recovery stage. The product gas recovery stage is intended to recover hydrogen or other product gases (e.g., carbon monoxide or methane) absorbed by the physical solvent, and may have an expansion ratio greater than the first pressure reduction stage.

The method may also include separating the carbon dioxide from the solvent before each subsequent pressure reduction stage, compressing the carbon dioxide and transporting the carbon dioxide for sequestration.

The invention also encompasses an apparatus for removing carbon dioxide from a gas mixture. The apparatus uses a liquid physical solvent to preferentially absorb the carbon dioxide and yield a product gas having a lower concentration of carbon dioxide than the gas mixture. The apparatus comprises an absorption vessel adapted to bring the liquid physical solvent into contact with the gas mixture under pressure. The absorption vessel has a solvent inlet for admitting the solvent to the absorption vessel, a gas inlet for admitting the gas mixture to the absorption vessel, a gas outlet for releasing the product gas from the absorption vessel, and a solvent outlet for releasing the solvent from the absorption vessel. For advantageous economic operation a product gas recovery expansion means may be used. The product gas recovery expansion means is adapted to receive the solvent from the absorption vessel. Carbon dioxide and other gases absorbed from the gas mixture are released from the solvent in the product gas recovery expansion means. A compressor having an inlet in fluid communication with the product gas recovery expansion means and an outlet in fluid communication with the gas inlet of the absorption vessel moves gases released from the solvent in the product gas recovery expansion means back to the absorption vessel. The gases released in the product gas recovery expansion means usually have significant product gas in addition to the carbon dioxide, and for this reason it is economical to send the gases released in the product gas recovery expansion means back to the absorption vessel or to other processes so that the product gas absorbed by the solvent can be recovered. Other processes may include, for example, adsorption processes, separation processes, fuel recovery and feed recycle.

A first expansion means is adapted to receive the solvent from the product gas recovery expansion means (or from the absorption vessel if no product recovery means is present). Carbon dioxide is released from the solvent in the first expansion means. A second expansion means is adapted to receive the solvent from the first expansion means. Carbon dioxide is released from the solvent in the second expansion means. A third expansion means is adapted to receive the solvent from the second expansion means. Carbon dioxide is released from the solvent in the third expansion means. A compressor facility is in fluid communication with the first, second and third expansion means for receiving the carbon dioxide released from the solvent. The compressor facility compresses the carbon dioxide for transport away therefrom. In the apparatus according to the invention, the second expansion means is configured to reduce the pressure on the solvent at an expansion ratio greater than the expansion ratio of the first expansion means, and the third expansion means is configured to reduce the pressure on the solvent at an expansion ratio greater than the expansion ratio of the second expansion means. Additional expansion means may also be used, each one being configured to reduce the pressure on the solvent at a greater expansion ratio than a preceding expansion means.

At least one of the expansion means comprises a throttling means in fluid communication with an expansion tank. The solvent enters the expansion tank through the throttling means which causes carbon dioxide and other gases to be released from the solvent. The gases collect in a gas space above the solvent within the expansion tank. The throttling means may comprise, for example a device such as an orifice, a pipe or a valve.

The apparatus may also include a stripping vessel in which residual carbon dioxide is stripped from the solvent by contacting the solvent with a pure gas such as steam or nitrogen. The stripping vessel has a solvent inlet in fluid communication with one of the expansion means for admitting solvent to the stripping vessel. A solvent outlet from the stripping vessel is in fluid communication with the solvent inlet of the absorption vessel. Once the solvent is stripped of residual gas, a pump pumps the solvent from the stripping vessel back to the absorption vessel. A pure gas inlet admits a substantially pure gas to the stripping vessel, and a gas outlet releases the gases from the stripping vessel.

DETAILED DESCRIPTION OF THE INVENTION

Figure 1:
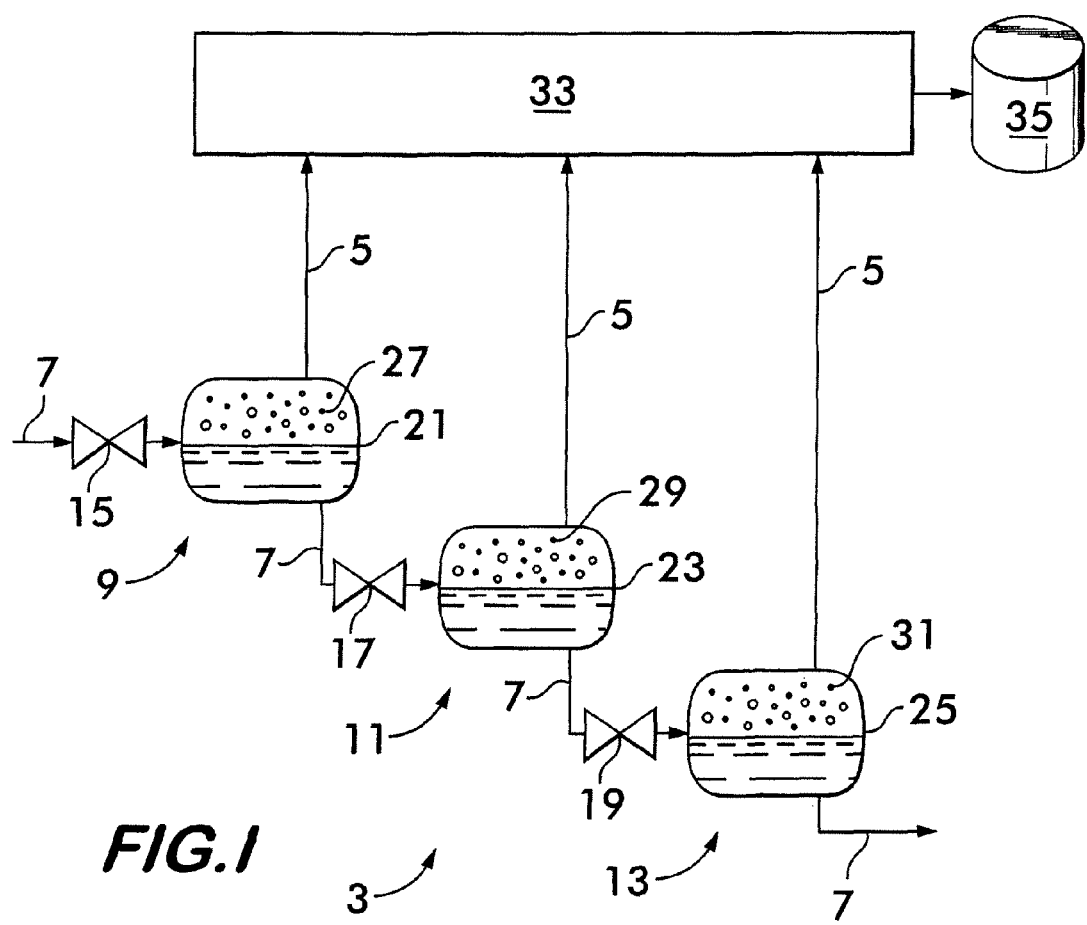
FIG. 1 is a schematic illustration of an apparatus for removing a gas dissolved in a liquid according to a method of the invention.

FIG. 1 shows a schematic representation of an apparatus 3 for removing a gas 5 dissolved in a liquid 7 according to a method of the invention. Apparatus 3 comprises three or more expansion stages 9, 11 and 13. Each expansion stage is comprised of a respective throttling device 15, 17 and 19 and a respective expansion tank 21, 23 and 25. Throttling devices 15, 17 and 19 could be, for example, an orifice, a valve, a pipe or other device which acts as a constriction to the flow of fluid to each respective expansion tank. As shown, fluid flow to each tank is controlled by a respective throttling device, and the tanks are connected to one another in series.

Each tank has a respective gas space 27, 29 and 31 where gas 5 which is liberated from the liquid 7 may accumulate and be drawn off by a compressor facility 33. The compressor facility may conduct the gas to a pipeline for further transport, for example, to a sequestration facility 35.

In operation, liquid 7 containing the dissolved gas 5 is fed through throttling device 15 into expansion tank 21 where the liquid undergoes a reduction in pressure at a first expansion ratio $R_1$. (The expansion ratio for a particular expansion stage "$R_n$" is defined as $R_n = P_{n-1}/P_n$ wherein $P_{n-1}$ is the absolute pressure of the gas at the preceding stage and $P_n$ is the absolute pressure of a subsequent stage n.) Gas 5, liberated from the liquid by the pressure reduction, accumulates in the gas space 27 where it is drawn off by the compressor facility 33. Liquid 7 then passes from expansion tank 21 through throttling device 17 and into expansion tank 23 where there is another reduction in pressure on the liquid, and more gas is liberated. The expansion ratio $R_2$ for this second expansion stage is greater than the expansion ratio $R_1$ in the first expansion stage. Gas liberated in the second expansion stage accumulates in gas space 29 and is drawn off by the compressor facility 33. Liquid 7 then passes from expansion tank 23 through throttling device 19 and into expansion tank 25 where there is another reduction in pressure on the liquid, and more gas is liberated. The expansion ratio $R_3$ for this third expansion stage is greater than the expansion ratio $R_2$ in the second expansion stage. Gas liberated in the third expansion stage accumulates in gas space 31 and is drawn off by the compressor facility 33. Additional expansion stages may be used to further liberate gas at ever increasing expansion ratios according to the invention. The number of expansion stages and the relation of the expansion ratios may be determined to optimize various parameters depending upon the particular application for which the method and apparatus are employed.

Figure 2:
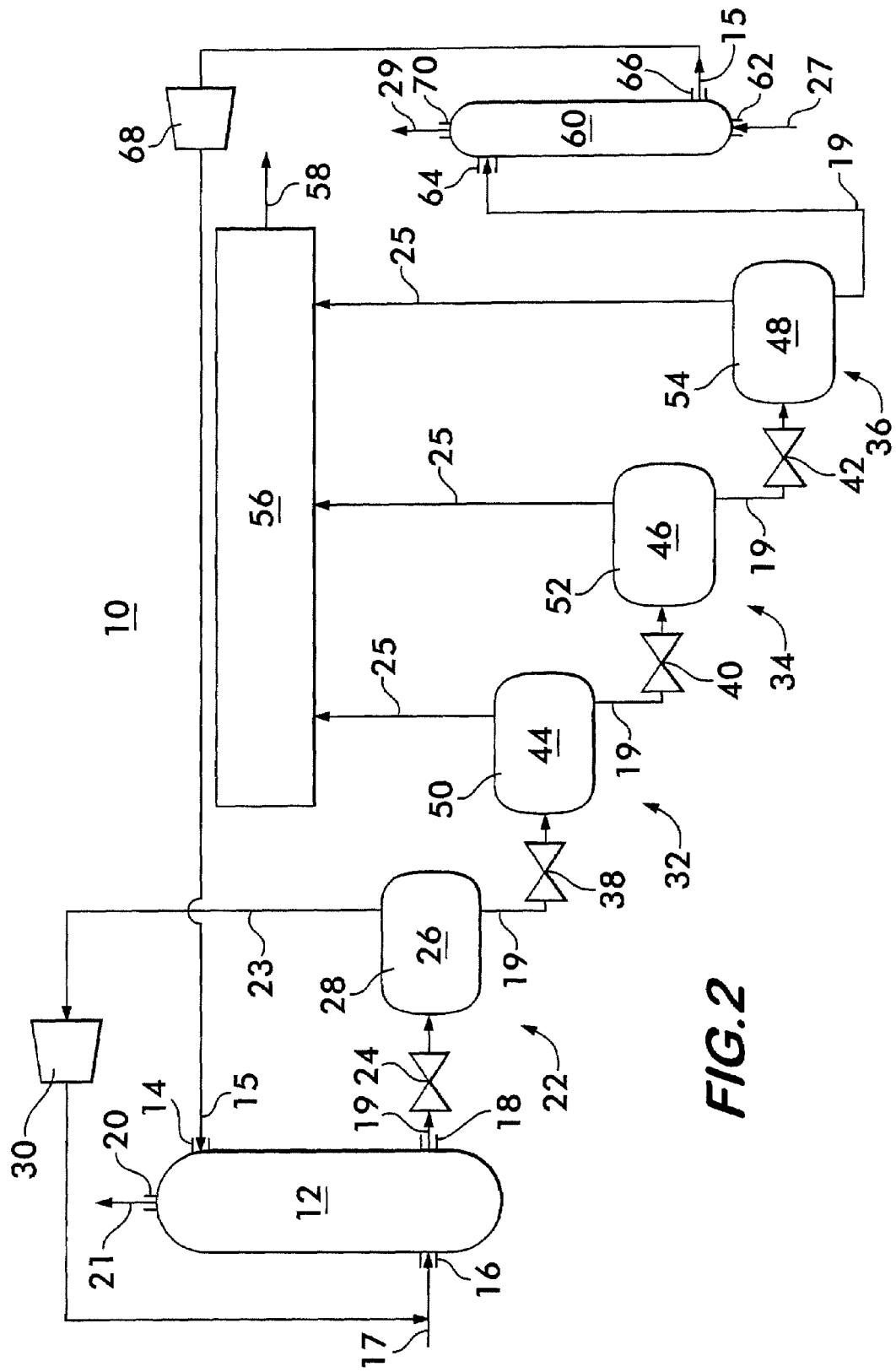
FIG. 2 is a schematic illustration of an apparatus for sweetening synthesis gas according to a method of the invention.

By way of a practical example of the method and apparatus according to the invention, FIG. 2 shows a schematic representation of an apparatus 10 for sweetening synthesis gas by the removal of carbon dioxide, it being understood that other applications of the apparatus and method according to the invention are also feasible.

Apparatus 10 includes an absorption vessel 12. The absorption vessel has a solvent inlet 14 for admitting a physical solvent 15 to the vessel, such as dimethyl ethers of polyethylene glycol, methanol, or propylene carbonate, which will preferentially absorb carbon dioxide from a gas mixture. Vessel 12 also has a gas inlet 16 for admitting a synthesis gas 17. The synthesis gas comprises a mixture containing hydrogen as well as other undesired constituents (such as carbon dioxide) and may be derived from various processes such as steam methane reforming, the water gas shift reaction, and the gasification of various solids such as coal, coke, and heavy liquid hydrocarbons present in oil refinery waste products. Vessel 12 also has a solvent outlet 18 which permits carbon dioxide laden solvent 19 to exit the vessel and a product gas outlet 20 which permits product gas 21 having a low carbon dioxide concentration to leave the vessel for further processing.

The absorption vessel 12 may be a high pressure tank which contains structured packings or trays that provide a large surface area to facilitate contact between the synthesis gas 17 and the solvent 15 to promote mass transfer between the gas and the solvent for physical absorption of the carbon dioxide by the solvent. The absorption vessel operates over a pressure range between about 300 psia and 1200 psia and can attain carbon dioxide removal rates above 95%.

The solvent outlet 18 is in fluid communication with a product gas recovery expansion means 22, which includes a throttling means 24 and an expansion tank 26. The throttling means 24 is a device such as a valve, an orifice, or even a pipe or other device which acts as a constriction to the flow of fluid between the absorption vessel 12 and the expansion tank 26 and causes a throttling process to occur as the solvent 19 moves from the higher pressure absorption vessel to the expansion tank at a lower pressure. The pressure reduction liberates gases absorbed by the solvent, and the gases collect in a gas space 28 in the upper portion of the expansion tank 12. In this product gas recovery expansion stage of the solvent, significant amounts of product gas (hydrogen) are released from the solvent. To recapture the product gas absorbed by the solvent a compressor 30 draws the gases 23 from the gas space of the expansion tank 26 and pumps them back to the synthesis gas inlet 16 of the absorption vessel 12 where the carbon dioxide constituent may be absorbed again by the solvent and the hydrogen may be entrained and exit the absorption vessel as product gas. A turbine pump could also be used in place of the compressor 30.

As shown in FIG. 2 a plurality of expansion means 32, 34 and 36 are in fluid communication with one another and with the product gas recovery expansion means in a series relationship. Each expansion means comprises a respective throttling means 38, 40 and 42 constricting fluid flow to a respective expansion tank 44, 46 and 48. Although three expansion means downstream of the product gas recovery means are shown, it is understood that this is by way of example, and additional expansion means are also feasible. Solvent 19 flows from tank 26 through the various throttling means 38, 40 and 42 to each expansion tank 44, 46 and 48 in turn, undergoing a reduction in pressure at each expansion stage and releasing carbon dioxide into the gas spaces 50, 52 and 54 in each tank.

A compressor facility 56 is in fluid communication with the gas spaces 50, 52 and 54 of the expansion tanks 44, 46 and 48 of the expansion means 32, 34 and 36. The compressor facility comprises multi-stage compressors or pumps which draw the carbon dioxide 25 released from the solvent from the gas spaces and compress the gas to pressures greater than 85 bar so that it may be transported in a pipeline 58 for sequestration in a geological formation such as an oil field or underground saline aquifer. It is in the compressor facility that more than 50% of the cost of operating the system may be incurred, and actions which can be taken to reduce the number and size of the pumps and the power needed to run the pumps may be used to good effect to increase the economic efficiency of the apparatus.

The inventors have found that by operating the expansion stages which occur in expansion means 32, 34 and 36 at increasing expansion ratios, the power needed to operate the compressor facility may be reduced or minimized. The expansion ratio of an expansion stage is defined as $R_n = P_{n-1}/P_n$ wherein $P_{n-1}$ is the absolute pressure of stage n−1 and $P_n$ is the absolute pressure of a subsequent stage n. Thus the invention discloses that, to minimize the power consumption of the compressor facility, the relation between the expansion ratios of the expansion stages should be $R_1 < R_2 < R_3 < \ldots R_N$ where N is the total number of expansion stages wherein the expansion ratio is increasing. The total number of expansion stages with increasing expansion ratios is preferably not less than 3 for acid gas removal from a synthesis gas stream. Preferably, in a particular expansion stage, $P_{n-1}$ is greater than or equal to $1.005 \times P_n$.

The desired expansion ratios in each expansion stage may be obtained by controlling the pressure in each expansion tank 44, 46 and 48. This may be done by using a pressure transducer in each tank which controls a respective variable valve in each of the associated throttling means 38, 40 and 42 through respective feed-back loops. Alternately, the throttling means could use fixed orifices appropriately sized at each stage to achieve the desired tank pressures for a given expansion tank size and solvent through-put rate.

Solvent 19 leaves the final expansion tank 48 substantially free of carbon dioxide. The solvent could be directly returned to the absorption vessel 12 or it could be sent to a stripping vessel 60. The stripping vessel removes the last traces of carbon dioxide from the solvent by contacting the solvent with a pure gas 27 such as steam or nitrogen. Stripping vessel 60 comprises structured packing or trays similar to the absorption vessel and includes a pure gas inlet 62 for admitting the steam, nitrogen, or other substantially pure gas which is used to absorb the remaining carbon dioxide from the solvent. The stripping vessel 60 also has a solvent inlet 64 that receives solvent 19 from the final expansion tank 48. The lean solvent 15, stripped of carbon dioxide, exits the stripping vessel through a solvent outlet 66 and is returned to the absorption vessel by a pump 68, either directly as shown or through an intermediate solvent reservoir (not shown). The mixture of once pure gas and stripped carbon dioxide 29 is vented to the atmosphere through a gas outlet 70.

To demonstrate the improved efficiency of the method and apparatus according to the invention over the prior art, calculations were performed simulating a system using increasing expansion ratios as taught by the invention for the apparatus shown in FIG. 2 having three subsequent expansion stages as described in the 1999 paper of Chiesa et al. For a head to head comparison the same parameters as found in Chiesa et al were used in the simulation. The simulation used methanol solvent at 30° F. The absorption vessel was assumed to operate at 750 psia and 100° F. The operational pressure range of the expansion stages determined by Chiesa et al (300 psia to 16 psia) was used as the boundary conditions to determine the expansion ratios according to the invention. Pressure in the product gas recovery expansion tank 26 was 300 psia at a temperature of 54° F., pressure in the first expansion tank 44 was 150 psia at 25° F., pressure in the second expansion tank 46 was 55 psia at 25° F., and pressure in the third expansion tank 48 was 16 psia at 25° F. Thus the increasing expansion ratios for the simulation of the method according to the invention were $R_1=2.00$, $R_2=2.73$ and $R_3=3.44$. (Note that the expansion ratio between the absorption vessel 12 and the product gas recovery expansion stage is 2.5, but this stage does not produce carbon dioxide gas that is compressed by the compression facility, so it does not figure in the expense or cost saving calculation.) The Expansion ratios in Chiesa et al were a constant for all three expansion stages. The following chart provides a convenient comparison of the process according to the invention with a process having a constant expansion ratio as described in the prior art. The simulation values are shown adjacent to the values obtained with a constant pressure ratio (in parentheses) for each category.

| Expansion Stage | Final Stage Pressure (psia) starting pressure 300 psia for 1st stage | | Expansion Ratio | | % CO2 Released | |
|---|---|---|---|---|---|---|
| 1 | 150 | (112.5) | 2.00 | (2.66) | 43.7 | (60.7) |
| 2 | 55 | (42.5) | 2.73 | (2.66) | 38.8 | (26.1) |
| 3 | 16 | (16) | 3.44 | (2.66) | 17.4 | (13.2) |

The chart makes clear that essentially the same total percentage of carbon dioxide is released in both systems, but, in the system using increasing expansion ratios according to the invention, more carbon dioxide is released at a higher pressure for a particular stage (55 psia versus 42.5 psia) between the fixed boundary conditions of 300 psia and 16 psia. Although less carbon dioxide is released in the first stage, the carbon dioxide is released at a higher pressure (e.g., 150 psia versus 112.5 psia) which has a direct effect on compression power. By using increasing expansion ratios, there is an optimization of the trade off between the amount of gas released and the pressure level at which that gas is released, which means that less energy will be required by the compression facility to compress the carbon dioxide 25 released in the system according to the invention. The calculated power required to run the compression facility using increasing expansion ratios according to the invention is 28,000 brake horsepower, considerably less than the 29,000 brake horsepower required when the expansion ratio is held constant across the expansion stages. This is a savings of 4.5%. Smaller but significant savings are predicted in comparison with the results of the 2005 paper by Chiesa et al, which uses a constant expansion ratio for two of the three expansion stages of operation. It should be understood that this simulation is intended to provide an example comparison with the known prior art, and does not fully address the potential for cost savings believed achievable when increasing expansion ratios are used as described and claimed herein.

The invention claimed is:

1. A method of removing a gas dissolved in a liquid under pressure, said method comprising:
   combining a gas comprising at least one acidic gas with a liquid under pressure in order to form a pressurized liquid having at least one acidic gas dissolved therein; wherein the pressurized liquid comprises a solvent and the solvent preferentially absorbs the at least one acidic gas,
   reducing the pressure on said liquid at a first expansion ratio, a first portion of said gas being thereby released from said liquid;
   drawing off said first portion of said gas from said liquid;
   reducing the pressure on said liquid at a second expansion ratio greater than said first expansion ratio, a second portion of said gas being thereby released from said liquid;
   drawing off said second portion of said gas from said liquid; and
   reducing the pressure on said liquid at a third expansion ratio greater than said second expansion ratio, a third portion of said gas being thereby released from said liquid;
   and wherein expansion ratio $R_n$ is defined as $P_{n-1}/P_n$ and $P_{n-1}$ is the absolute pressure of the gas at a preceding stage and $P_n$ is the absolute pressure of the gas at a subsequent stage n.

2. A method according to claim 1, further comprising compressing said gas portions;
   transporting said gas portions; and
   sequestering said gas portions in a storage facility.

3. A method of removing a gas dissolved in a liquid under pressure, said method comprising:
   providing pressurized liquid having a gas comprising carbon dioxide dissolved therein; wherein the liquid comprises a liquid physical solvent and the solvent absorbs carbon dioxide,
   reducing the pressure on said liquid in a product recovery pressure reduction stage and a plurality of subsequent pressure reduction stages beginning with a first subsequent pressure reduction stage, wherein each subsequent pressure reduction stage after said first subsequent pressure reduction stage occurs at an expansion ratio, in absolute pressure, greater than the pressure reduction stage which preceded it, a portion of said gas being released from said liquid at each pressure reduction stage.

4. A method according to claim 3, comprising 3 subsequent pressure reduction stages.

5. A method according to claim 3, wherein said product recovery pressure reduction stage has an expansion ratio greater than said first subsequent pressure reduction stage.

6. A method of removing carbon dioxide gas from a gas mixture comprising hydrogen and carbon dioxide, said method comprising:
   bringing said gas mixture into contact with a liquid physical solvent under pressure, said solvent preferentially absorbing carbon dioxide gas from said gas mixture into the liquid;
   reducing the pressure on said solvent in a product recovery pressure reduction stage;
   further reducing the pressure on said solvent in a plurality of subsequent pressure reduction stages beginning with a first subsequent pressure reduction stage, wherein each subsequent pressure reduction stage after said first subsequent pressure reduction stage occurs at an expansion ratio greater than the preceding pressure reduction stage wherein a portion of said carbon dioxide gas absorbed by said solvent being released from said solvent at each pressure reduction stage, and wherein expansion ratio $R_n$ is defined as $P_{n-1}/P_n$ and $P_{n-1}$ is the absolute pressure of the gas at a preceding stage and $P_n$ is the absolute pressure of the gas at a subsequent stage n.

7. A method according to claim 6, wherein said product recovery pressure reduction stage has an expansion ratio greater than said first subsequent pressure reduction stage.

8. A method according to claim 6, further comprising bringing said gases released from said product recovery pressure reduction stage into contact with said solvent.

9. A method according to claim 6, further comprising:
drawing off said carbon dioxide from said solvent before each subsequent pressure reduction stage after said first subsequent pressure reduction stage;
compressing said carbon dioxide; and
transporting said carbon dioxide for sequestration.

10. A method according to claim 6, comprising deriving said gas mixture from a process selected from the group consisting of steam methane reforming, water gas shift reaction, partial oxidation of natural gas, gasification of coal, gasification of coke, partial oxidation of heavy hydrocarbons and combinations thereof.

11. A method according to claim 6, comprising executing 3 subsequent pressure reduction stages.

12. A method according to claim 6, wherein said liquid physical solvent is selected from the group consisting of dimethyl ethers of polyethylene glycol, methanol, propylene carbonate and combinations thereof.

13. A method according to claim 6, further comprising stripping carbon dioxide from said solvent subsequent to said pressure reduction stages by bringing said solvent into contact with a substantially pure gas.

14. A method according to claim 13, wherein said substantially pure gas is selected from the group consisting of steam and nitrogen.

15. The method of claim 6 wherein said method is performed in an apparatus comprising:
a first expansion means adapted to receive said solvent, gases absorbed in said solvent being released from said solvent in said first expansion means;
a second expansion means adapted to receive said solvent from said first expansion means, said gases being released from said solvent in said second expansion means;
a third expansion means adapted to receive said solvent from said second expansion means, said gases being released from said solvent in said third expansion means;
wherein said second expansion means is configured to reduce the pressure on said solvent at an expansion ratio greater than the expansion ratio of said first expansion means, and said third expansion means is configured to reduce the pressure on said solvent at an expansion ratio greater than the expansion ratio of said second expansion means.

16. The method according to claim 15, further comprising a compressor facility in fluid communication with said first, second and third expansion means for receiving the gases released from said solvent, said compressor facility compressing said gases for transport away therefrom.

17. The method of claim 15 wherein said method is conducted in an apparatus comprising:
an absorption vessel adapted to bring said liquid physical solvent into contact with said gas mixture under pressure, said absorption vessel having a solvent inlet for admitting said solvent to said absorption vessel, a gas inlet for admitting said gas mixture to said absorption vessel, a gas outlet for releasing said product gas from said absorption vessel, and a solvent outlet for releasing said solvent from said absorption vessel;
a product recovery expansion means adapted to receive said solvent from said absorption vessel, carbon dioxide and other gases absorbed from said gas mixture being released from said solvent in said product recovery expansion means;
a compressor having an inlet in fluid communication with said product recovery expansion means and an outlet in fluid communication with said gas inlet of said absorption vessel, said compressor moving gases released from said solvent in said product recovery expansion means back to said absorption vessel;
a first expansion means adapted to receive said solvent from said product recovery expansion means, carbon dioxide being released from said solvent in said first expansion means;
a second expansion means adapted to receive said solvent from said first expansion means, carbon dioxide being released from said solvent in said second expansion means;
a third expansion means adapted to receive said solvent from said second expansion means, carbon dioxide being released from said solvent in said third expansion means;
a compressor facility in fluid communication with said first, second, and third expansion means for receiving the carbon dioxide released from said solvent, said compressor facility compressing said carbon dioxide for transport away therefrom; wherein
said second expansion means is configured to reduce the pressure on said solvent at an expansion ratio greater than the expansion ratio of said first expansion means, and said third expansion means is configured to reduce the pressure on said solvent at an expansion ratio greater than the expansion ratio of said second expansion means.

18. The method according to claim 17, further comprising a plurality of additional expansion means, said additional expansion means being in fluid communication in series with each other and said third expansion means, wherein each of said additional expansion means is configured to reduce the pressure on said solvent at an expansion ratio greater than the expansion ratio of a preceding one of said expansion means.

19. The method according to claim 18, further comprising:
a stripping vessel having a solvent inlet in fluid communication with one of said expansion means for admitting solvent to said stripping vessel, and a solvent outlet in fluid communication with said solvent inlet of said absorption vessel;
a pump for pumping said solvent from said stripping vessel to said absorption vessel;
a pure gas inlet for admitting a substantially pure gas to said stripping vessel; and
a gas outlet for releasing gas from said stripping vessel.

20. The method according to claim 17, wherein at least one of said expansion means comprises a throttling means in fluid communication with an expansion tank, said solvent entering said expansion tank through said throttling means, carbon dioxide and other gases being released from said solvent and collecting in a gas space above said solvent within said expansion tank.

21. The method according to claim 20, wherein said throttling means comprises a device selected from the group consisting of an orifice, a pipe and a valve.

22. The method according to claim 1 wherein the acidic gas comprises at least one member selected from the group consisting of carbon dioxide and hydrogen sulfide.

23. The method according to claim 22 wherein the solvent comprises at least one member selected from the group consisting of dimethyl ethers of polyethylene glycol, methanol and propylene carbonate.

24. The method according to claim 22 wherein said gas further comprises hydrogen.

* * * * *